United States Patent [19]

Minnich, II

[11] Patent Number: 4,651,957
[45] Date of Patent: Mar. 24, 1987

[54] LARGE CAPACITY TOW/RELEASE APPARATUS

[75] Inventor: Basil H. Minnich, II, Long Beach, Calif.

[73] Assignee: The United States of America as represented by the Secretary of the Air Force, Washington, D.C.

[21] Appl. No.: 746,900

[22] Filed: Jun. 20, 1985

[51] Int. Cl.⁴ .............................................. B64D 1/08
[52] U.S. Cl. ................................................. 244/137 L
[58] Field of Search ........... 244/137 R, 137 L, 151 B; 294/82.3

[56] References Cited

U.S. PATENT DOCUMENTS

| | | | |
|---|---|---|---|
| 2,868,581 | 1/1959 | Minty et al. | 294/83 |
| 3,113,751 | 12/1963 | Cotton | 244/137 |
| 3,396,924 | 8/1968 | Kriesel | 244/137 |
| 3,610,674 | 10/1971 | Janssen | 294/82.3 |
| 3,670,999 | 6/1972 | Leger | 244/137 |
| 3,781,055 | 12/1973 | Keich et al. | 244/137 L |
| 3,801,051 | 4/1974 | Hosterman et al. | 244/137 R |
| 3,865,333 | 2/1975 | Fielding et al. | 244/151 B |
| 3,872,556 | 3/1975 | Frost | 244/151 B |
| 4,303,213 | 12/1981 | Bolender et al. | 244/137 R |
| 4,398,686 | 8/1983 | Leger et al. | 244/137 R |

Primary Examiner—Galen Barefoot
Attorney, Agent, or Firm—Gerald B. Hollins; Donald J. Singer

[57] ABSTRACT

A tow/release mechanism or towplate usable inter alia for controlling the initiation of a parachute extraction sequence in a cargo carrying aircraft—including operation capability while loaded with forces in the range of 70,000 lbs. The disclosed mechanism includes in-floor mounting, magnetic "armed" indication, and high structural integrity. Low-friction bearings are excluded from the mechanism, while compatibility with existing equipment parachute links, and use of hydraulic actuation are included. The disclosed mechanism is incorporatable in plural locations in the rearward portion of an aircraft and usable with either high altitude parachute cargo extraction or low altitude parachute extraction systems (LAPES); a typical LAPES sequence is also disclosed.

20 Claims, 12 Drawing Figures

LARGE CAPACITY TOW/RELEASE APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of mechanisms capable of anchoring and electively releasing large loads from a retaining anchorage such as might be employed in controlling the parachute extraction of cargo from a moving aircraft.

The use of a parachute to extract cargo from the rear of a moving aircraft at either high or low altitudes has become an accepted procedure in military operations. The desirability of rapidly delivering relatively large quantities of military hardware with minimal exposure of the delivering aircraft to hostile military action and the absence of aircraft ground turnaround time at the cargo delivery site are two readily identified advantages of a parachute delivery arrangement.

The low level version of this parachute delivery arrangement, Low Altitude Parachute Extraction System, or LAPES, has become especially important in the era of brush fire or limited involvement conflicts where there is need to deliver cargo from supply centers located far from the delivery point. The C-5, C-130 and now the C-17 aircraft used by the U.S. Air Force have been especially adapted for achieving LAPES and also high altitude parachute cargo delivery. As cargo aircraft have evolved and refinements of the parachute delivery technique have occurred, the size and weight of the delivered cargo loads have increased notably until presently, this form of delivery for loads weighing as much as 55,000 pounds or 27½ tons is contemplated.

Accompanying the military advantages of this form of cargo delivery, however, is a recognized set of operational hazards to the cargo, the delivering aircraft, the equipment and personnel in the delivery zone and the crewmembers of the delivering aircraft. One need only consider the consequences of a delivery mishap wherein cargo the size of a military truck or armored tank became temporarily jammed in the open rear aperture of a delivering aircraft or a large cargo extraction parachute became inflated and irremovably tethered to the aircraft—making the aircraft incapable of flying, in order to recognize the need for sure and positive equipment operation in LAPES delivery sequence.

An additional important consideration in the LAPES environment concerns need for positive and remotely controllable initiation of a LAPES event—often by the aircraft pilot, in order that the pilot be prepared for the significant changes in aircraft flight characteristics resulting from shifting and removal of heavy cargo loads with respect to the aircraft. Moving of a 55,000 pound load from a location forward of an aircraft center of gravity point to a location rearward of the aircraft center of gravity point and thence suddenly out of the aircraft can be expected to have noticeable influence on the aircraft flight characteristics. This influence is especially of interest to the aircraft pilot in the usual LAPES scenario where the aircraft is flying at altitudes as low as 10 feet above the ground. Removal of a cargo load of this magnitude from the rear of an aircraft can be expected, for example, to produce a sudden nose-down tendency in the aircraft flight path.

One of the better arrangements for accommodating such changes in a flying aircraft has been found to reside in providing the final release of cargo in response to an act executed by the aircraft pilot—a release accomplished without the intervention of a loadmaster or other "middleman" crewmembers. Pilot initiated cargo releases allow the pilot to be optimally prepared to compensate for flight path changes of the aircraft. Such cargo releases, without question call for highly reliable and remotely controllable cargo release apparatus.

Precise control of the cargo release event is of course also necessary in order that the cargo arrive in the intended location on the ground. For an aircraft moving at a speed of 120 miles per hour each one-tenth second of error in cargo release time corresponds to eighteen feet of error in the cargo delivery point. One need only consider the accounts of cargo delivery mishaps recorded in the WWII Normandy invasion history, including cargo falling into water or into enemy hands, to appreciate the military significance of precise air cargo delivery operations.

Some apparatus and procedures used for LAPES and other forms of air cargo delivery have been documented in the patent art; this art includes the patents of Leger et al, U.S. Pat. No. 4,398,686 and U.S. Pat. No. 3,670,999; Bolender et al, U.S. Pat. No. 4,303,213; Fielding et al, U.S. Pat No. 3,865,333; Hosterman et al, U.S. Pat. No. 3,801,051; an earlier patent of Leger, U.S. Pat. No. 3,670,999; Kriesel, U.S. Pat. No. 3,396,924; Cotton, U.S. Pat. No. 3,113,751; and Minty et al, U.S. Pat. No. 2,868,581. The disclosure of these patents is hereby incorporated by reference into the present specification.

The cargo delivering apparatus described in these patents can generally be considered to fall in two classes, i.e., arrangements achieving cargo extraction from the aircraft upon manual actuation of a cargo releasing towplate or tow/release apparatus—an actuation accomplished using flexible cables, lever arms, control rods, and similar linkages, and arrangements using electrical solenoid actuation of the towplate apparatus. Inherently, in early designs, it has been necessary to carefully limit the amount of friction involved in achieving a towplate release event in order that manual force or the force provided by a reasonably sized electrical solenoid be capable of operating the towplate mechanism. Since considerable loading of the towplate by a towed drogue parachute or other loads is usually involved, the incorporation of ball bearings and other low friction arrangements is usually necessary in these towplate mechanisms. Modern design standards, for example, call for a towplate release event to be within the capability of a fiftieth percentile female operator—an operator capable of providing 15 lbs. of normal exertion force and 30 lbs. of maximum force.

Numerous problems have developed with these previous towplate devices; such problems preclude the satisfactory operation of the towplate over long time periods especially operation that must be achieved with forces of limited magnitude. Included in these problems are bending and distortion of towplate elements in repeated use (the lever arm 71 in the 4,398,686 patent towplate has been especially troublesome in this regard), the increase in towplate operating force as a result of dirt fouling, corrosion, and the absence of satisfactory long-term lubrication for the employed bearings, frequent failure of the towplate solenoid member and the undesirability of an exposed towplate mechanism in most aircraft. Electrical solenoid failure has been particularly troublesome in prior towplate devices because such solenoids are necessarily made small in size and light in weight in comparison with the needed solenoid output force—operation near the limit of solenoid fabrication material capability is thus required. In this environment, eventual circumstances such as inexperienced operators, control switch malfunctions, or a jammed towplate requiring several release attempts are sufficient to extend solenoid materials such as the magnet wire windings over the threshold of failure.

A particularly notable limitation of prior patent towplate devices has been their usability only with forces in the range of zero to 7,000 lbs.; that is, with prior devices the force exerted by a drogue parachute trailing the cargo aircraft was limited to the range of 7,000 lbs. Drogue parachute forces an order of magnitude greater than this value or 70,000 lbs. are contemplated in the present invention apparatus.

SUMMARY OF THE INVENTION

An object of the present invention is to provide a towplate or tow/release mechanism capable of operation with applied loads greatly exceeding the capability of previous mechanisms.

Another object of the invention is to provide a tow/release mechanism which can be easily operated.

Another object of the invention is to provide a tow/release mechanism which can be operated from remote locations, including the cockpit of the mounting aircraft.

Another object of the invention is to provide a tow/release mechanism capable of accommodating larger parachute and cargo strap bundles than have heretofore been needed.

Another object of the invention is to provide a tow/release mechanism capable of accommodating existing small-size cargo extraction links, as well as new large-size cargo extraction links.

Another object of the invention is to provide a tow/release mechanism capable of being mounted permanently in the floor of an aircraft.

Another object of the invention is to provide a tow/release mechanism having desirable structural rigidity and integrity—such rigidized integrity being in part achieved through omission of low friction bearings and other strength compromising arrangements.

Another object of the invention is to provide a tow/release mechanism which realizes the advantages and improvements of actuation by a pressurized fluid such as fluid from a hydraulic pump.

Another object of the invention is to provide a hydraulically actuated tow/release mechanism wherein insertion of the cargo to parachute connecting link member can be achieved without disturbing the hydraulic actuation apparatus or displacing hydraulic fluid.

Another object of the invention is to provide a tow/release mechanism having a more reliable "armed" indicator arrangement.

Another object of the invention is to provide a tow/release mechanism having a simple but effective anti-rattle arrangement for capturing a connection link member.

Another object of the invention is to provide a tow/release mechanism capable of being covered and hidden while mounted in a working surface such as the floor of an aircraft.

Another object of the invention is to provide a towplate mechanism capable of transmitting the incurred load forces to the towplate receiving structure by way of abutment compressive forces in contrast with tensile member shear forces.

Another object of the invention is to provide a tow/release mechanism wherein events tending the aborting of a cargo extraction sequence and jettisoning a drogue parachute is achieved by hydraulic or pressurized fluid operated devices.

Another object of the invention is to provide a pressurized fluid-operated tow/release mechanism in which a major portion of the mechanism is arranged to be removable from its mounting without disturbance of the pressurized fluid portion of the apparatus.

Another object of the invention is to provide a tow/release mechanism "armed" or "safe" indicator arrangement which is compatible with either a normal size or an existing equipment smaller size cargo extraction link and also compatible with a towplate cover plate member.

These and other objects of the invention will be understood from the description herein.

These and other objects of the invention can be achieved by an apparatus for controlling the drogue extraction of cargo from a moving aircraft which includes the cargo carrying aircraft, a drogue parachute device disposable trailing the aircraft, a rigid connecting link member capable of splicing flexible tension members received from the drogue device and from the aircraft carried cargo into an integral tension member, a cradle receptacle mounted adjacent a rearward opening of the aircraft and capable of releasably receiving and capturing the connecting link member and of thereafter connecting and pulling the drogue device tension member along with the aircraft, the cradle receptacle also including a link capturing latch member movably mounted therein, and pressurized fluid operated means connected with the cradle receptacle latch member for moving the latch member to a link releasing position in the presence of latch frictioned and link load from the drogue device.

DETAILED DESCRIPTION

Figure 1:
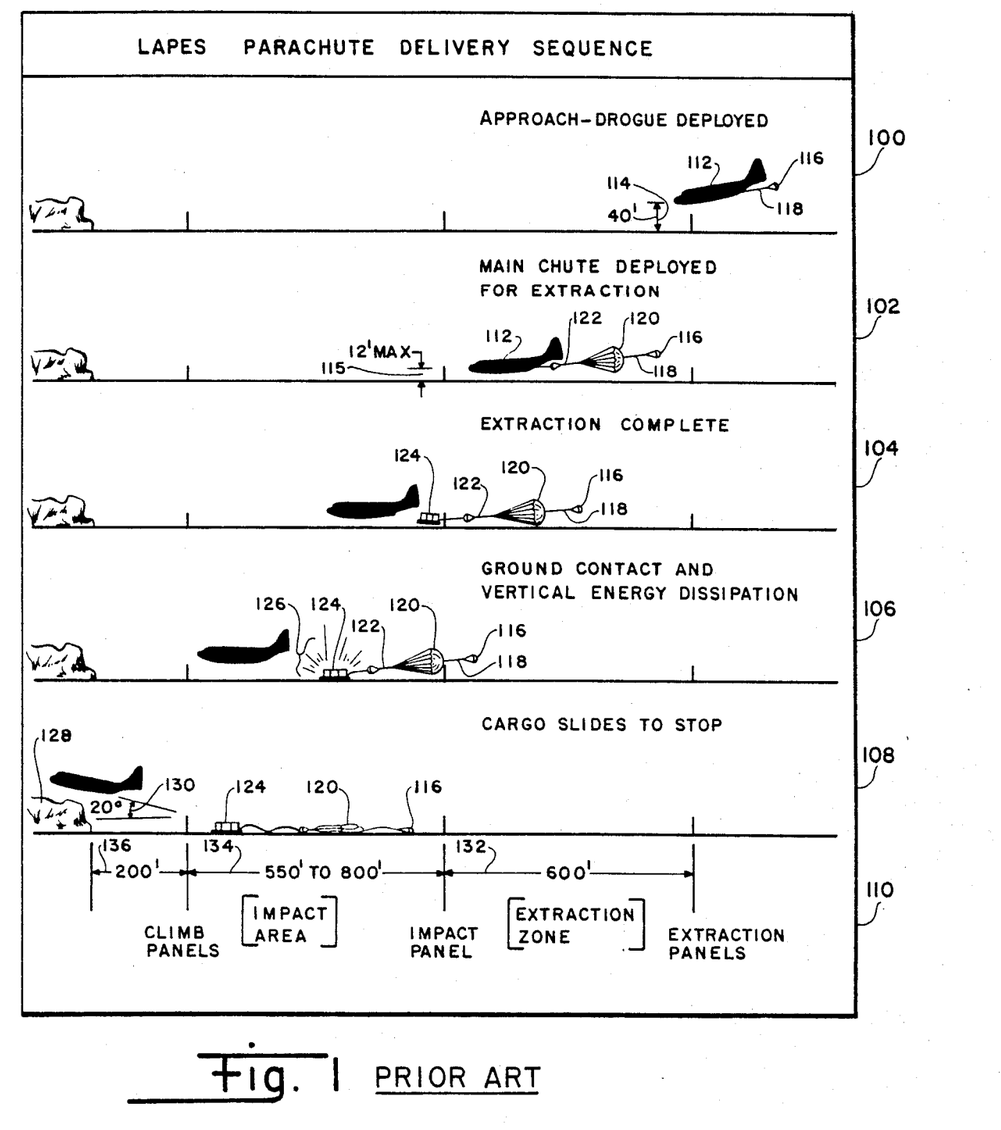
FIG. 1 is a sequential diagram showing LAPES delivery of cargo.

FIG. 1 in the drawings shows five sequential events in a low altitude parachute extraction system (LAPES) cargo delivery sequence as such a delivery might be performed by a C-130 aircraft. The FIG. 1 drawing is helpful in understanding the events occurring in a LAPES sequence and in defining terminology used in describing the present invention. In the first portion of the FIG. 1 sequence, identified with the number 100, the cargo carrying aircraft 112 is approaching the cargo delivery area with its landing gear down and traveling at an airspeed of approximately 130 miles per hour. During this part of a LAPES sequence the aircraft will have a drogue or drag parachute in tow and will be in a descending flight path which commenced at an altitude of 200 feet or more; this flight path includes an overfly of the initial extraction panels at an altitude of about 40 feet as indicated at 114 in FIG. 1.

The deployed drogue parachute is indicated at 116 in FIG. 1 and the flexible tension members connecting the drogue parachute with the aircraft are indicated at 118. These flexible tension members are usually in the form of a bundle of web-like straps as is shown in greater detail in FIG. 4 and the other drawings. It should be realized that the term "flexible tension member" is used herein in a generic sense and could refer to such arrangements as rope, wire cable, belts, and straps, and could therefore represent structures of flat, round, or some intermediate cross-sectional shape all as are known in the flexible tension member art. For aircraft uses of the invention, flexible tension members in the form of flat webs or straps are preferred.

Figure 2:
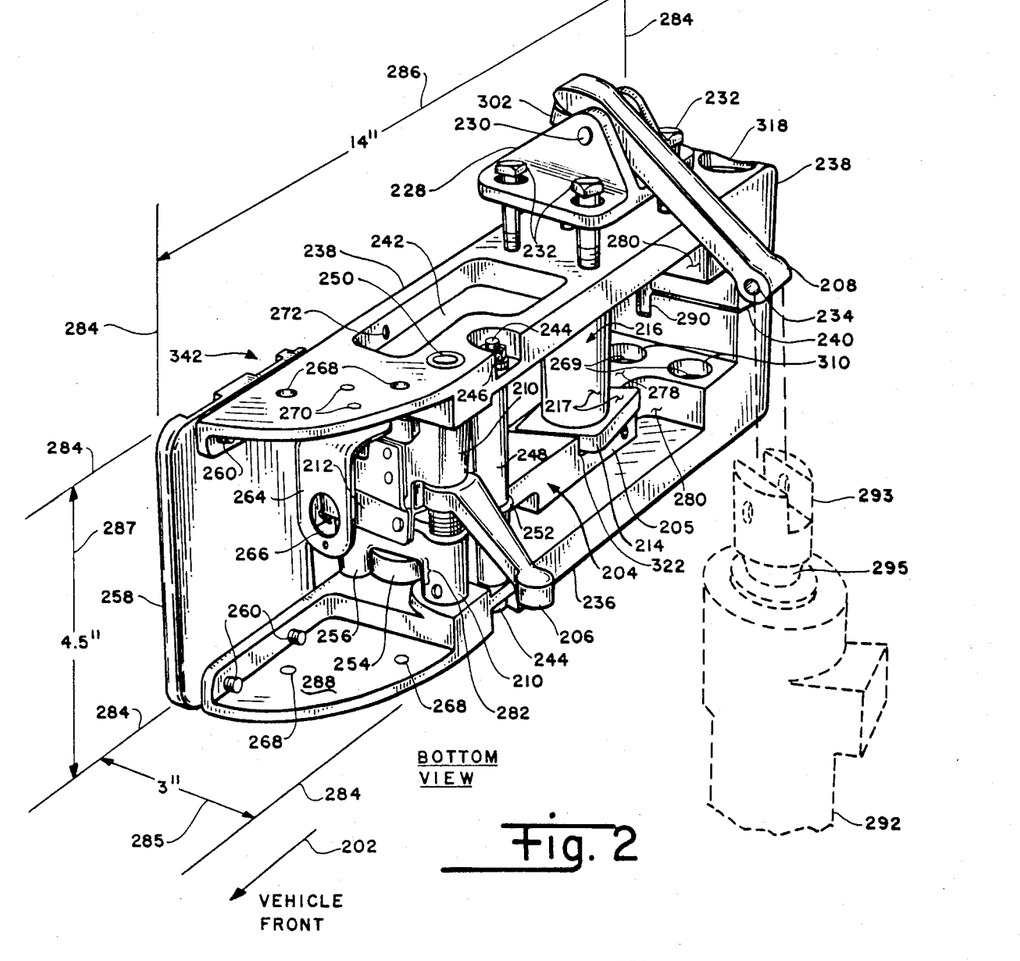
FIGS. 2 and 2A are a bottom side perspective view of a tow/release or towplate mechanism.

As suggested by the above language, the numbering system used in the present description employs one hundred series numbers in FIG. 1, two hundred series numbers in FIG. 2 and so on. Elements of the described apparatus appearing in more than one figure in the drawings of course, carry the same number in each figure and this number is generally assigned during the lowest number figure description of the element. The figure descriptions moreover proceed in a lowest-to-highest numerical order in the description organization. FIGS. 2-6 in the drawings moreover represent different views of the same structure.

The preferred practice in LAPES and higher altitude cargo delivery includes use of two parachutes, the above-indicated drogue parachute which may have a diameter of approximately 15 feet and a larger secondary or extraction parachute of 28 feet or larger diameter; the drogue parachute is used principally as a trigger or deployment device for the large or extraction parachute and also adds some useful area to the extraction parachute. The drogue parachute is made small enough to be towable behind the cargo aircraft in at least its LAPES delivery flying mode and large enough to quickly withdraw and inflate the extraction parachute. In the portion 102 of FIG. 1, the large extraction parachute is shown at 120 and the cargo extraction or cargo flexible tension member bundle is shown at 122. The apparatus of the present invention is concerned with events shown in the portions 100, 102, and 104 in FIG. 1 and especially in the transition between portions 100 and 102.

As indicated at 115 in the FIG. 1 portion 102, after the approach phase of a LAPES sequence, the pilot rounds off the aircraft descent pattern to attain a flair condition at approximately 10 feet above the extraction zone surface, this 10 feet of altitude is indicated as 12 feet maximum at 115 in FIG. 1. The extraction event is shown in the portion 104 of FIG. 1; this event is performed while the aircraft is maintained in a level attitude to the best degree practical. If the extraction maneuver is executed successfully, the aircraft does not touch down, but overflies the delivery area surface maintaining an altitude between 5 and 12 feet.

The extracted cargo lands and dissipates vertical energy components as indicated at 126 in the portion 106 of FIG. 1. Vertical energy dissipation occurs in the form of noise, compression of resilient material in the cargo package and its supports and depression of the earth. Horizontal energy components from the cargo are dissipated principally through frictional sliding with the cargo sliding to a stop at a point between 550 and 800 feet after the extraction point, as indicated at 134 in the FIG. 1 portion 110. The exact point of cargo landing and stopping depend on aircraft altitude, the watch between cargo and parachute forces, surface conditions at the landing point, and other variables.

Once cargo extraction is accomplished and the cargo is clear of the aircraft, the pilot can initiate a pullout maneuver using military reserve power, and ascent angles as large as 20 degrees as indicated at 130 in the portion 108 of FIG. 1. The aircraft 112 can incur G force accelerations as large as 2G when needed to clear obstacles such as the bluff 128 in FIG. 1. The panels indicated in FIG. 1 can be identified by signs or flags or other indicia for assisting the pilot and the ground personnel performing the cargo recovery. Typical ground distances involved in the FIG. 1 sequence are shown in the portion 110 of FIG. 1 and include a 600 foot extraction zone 132, the above-mentioned 550 to 800 feet impact area 134, and a climb panel as short as 200 feet as indicated at 136. The entire FIG. 1 sequence from extraction panel to climb panel usually requires less than six and one-half seconds to perform.

With the combination of cargo loads in the range of 55,000 lbs., drogue parachute forces in the range of 70,000 lbs., even larger extraction parachute forces, aircraft velocities of 130 knots, and total sequence times of 6½ seconds being involved, the necessity for sure and reliable operation of the events represented in the portions 100 and 102 in FIG. 1 can be further appreciated. Even a minor or briefly occurring equipment malfunction between the 100 and 102 portions of FIG. 1 could easily jeopardize the cargo to be delivered and the aircraft performing the delivery.

A high altitude parachute delivery sequence involves a series of steps much like those shown in FIG. 1 with the modification that the parachutes perform both extraction and lowering of the cargo from the high altitude extraction point to the earth. Additional details concerning the high altitude and LAPES delivery procedures are included in the above-incorporated by reference patents; in particular, the Hosterman et al, U.S. Pat. No. 3,801,051 patent shows a parachute delivery sequence in FIGS. 1-3 and the Cotton patent, U.S. Pat. No. 3,113,751, shows a modified parachute delivery system in FIGS. 1-5. It should be realized that even though the preferred present practice is to employ a large extraction parachute that is withdrawn and triggered or inflated with the aid of a smaller or drogue parachute, it is feasible to use a single parachute arrangement for cargo delivery and to employ a parachute of approximately drogue size for performing the complete delivery sequence, especially in the case of small and lightweight cargo loads.

FIGS. 2-10 of the drawings show an improved apparatus for controlling events attending the portions 100 and 102 in FIG. 1. The FIGS. 2-10 tow/release or towplate mechanism provides an arrangement compatible with present-day aircraft and the needs of presently conceived parachute delivery operations.

Figure 3:
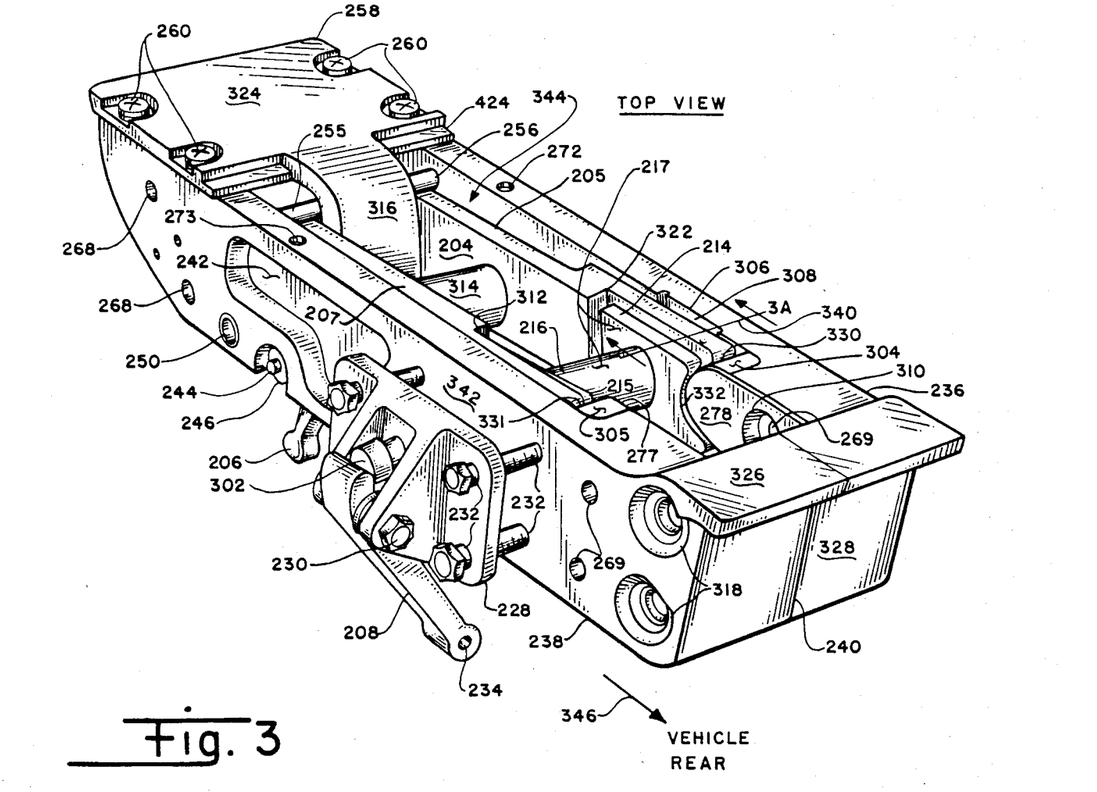
FIGS. 3 and 3A are a topside perspective view of a tow/release or towplate mechanism.

Since FIG. 2 through FIG. 6 of the drawings represent the same structure, drawings in this group will be referred to as needed in describing the invention. FIGS. 2 and 3 in the drawings, for example, show bottom and top perspective views of a towplate apparatus made in accordance with the invention. The FIGS. 2 and 3 apparatus includes a pair of side frame members 236 and 238 which meet in a junction 240 and are held together by a tongue plate member 258 attached by way of threaded screws 260. The side frame members or sides 236 and 238 are additionally held in integral relationship by bolts located in the recess wells 318 and by a bolt 244 and nut 246 which is received by an elongated annular spacer 248. The recess well 318 bolts are identified as 420 and 422 in FIG. 4.

The side frame members 236 and 238 define a cavity which is indicated at 344 in FIG. 3 and which receives a rigid extractable coupling link member 204 used to connect the drogue parachute with the cargo flexible tension members 118 and 122 in FIG. 1. The drogue parachute tension member 118 surrounds the mandrel 216 located at the junction 240 end or the rearward facing end of the link 204 and the FIGS. 2 and 3 apparatus. The FIG. 1 cargo flexible tension member 122 surrounds the mandrel 314 at the forward end of the link 204; the forward directing of the FIG. 2 apparatus is indicated at 202 in FIG. 2.

The link 204 is captured in the cavity 344 by mating with a pair of bosses or protuberances 277 and 278 at the rearward end of the FIGS. 2 and 3 apparatus and by a pivotally mounted latch member 210 that incorporates a pair of link capturing ears 255 and 256. The cavity forming sidewalls 236 and 238 and the other elements shown in FIGS. 2 and 3 may be conveniently referred to as a cradle receptacle for the link 204. The number 342 is used to generically identify this cradle receptacle and the number 204 to identify the link received in the cavity or cradle receptacle 342. The link 204 includes a pair of nose portions 254 formed by a pair of notch-like cuts visible at 400 in FIG. 4 of the drawings. The link nose portions 254 are held captive in the cradle receptacle 342 by receiving the latch ears 255 and 256 in the notch-like cuts 400 as is partially visible in FIGS. 2, 3 and 5 of the drawings.

Figure 6:
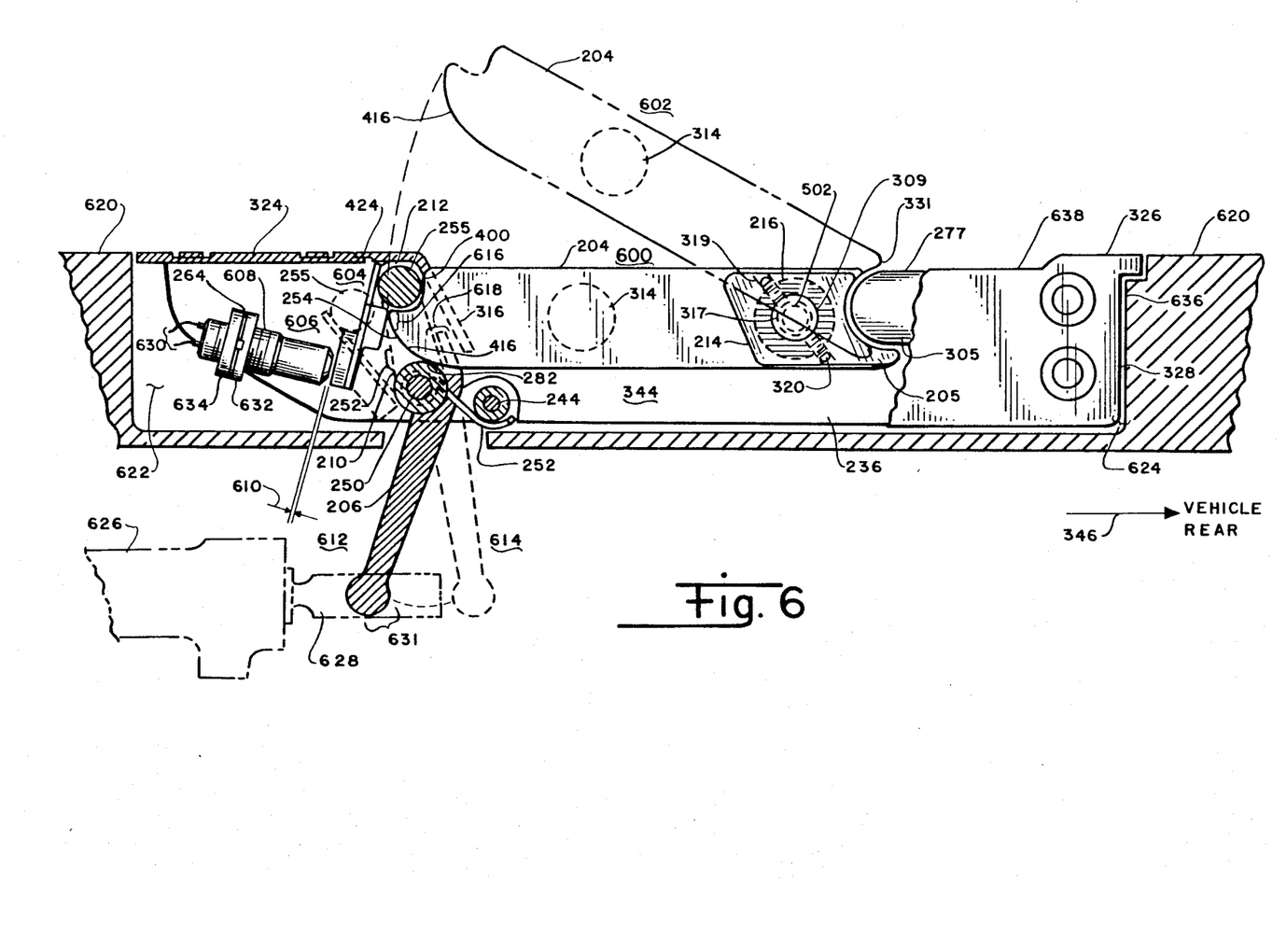
FIG. 6 is a cutaway side view of a tow/release mechanism showing the connecting link member in both the captured and a released position.

The latch member 210 in FIG. 2 is pivoted on a shaft 250 and is urged into a position of engagement with the link nose notches 400 by a torsion spring 252 visible in FIGS. 2 and 6 of the drawings. The curving lower portion of the link nose 254, the portion indicated at 416 in FIGS. 4 and 6 of the drawings, is allowed to rest on the pivoting surface of the latch indicated at 282 in FIG. 2 in order that the link 240 be held rigid in a three-point suspension while located in the cradle receptacle 342. Friction and wear at the resting surfaces 282 is not of concern in the mechanism, since the link forces of significant consequence are directed upward in FIG. 6.

The heel end of the link 204 rests on the convex surfaces 304 and 305 of the bosses 277 and 278 as is shown in FIGS. 2, 3 and 6 of the drawings. The convex curving shape of the bosses 277 and 278 and the mating link concave surfaces 330, 331 and 332, viewable in FIGS. 3, 4 and 5 of the drawings, serve to positively locate the heel end of the link 204 with respect to the cradle receptacle 342. The bosses 277 and 278 function as a male or protuberance member that is receivable at the concave or socket or female concave surfaces 330, 331, and 332.

The link latch member 210, viewable in in FIGS. 2 and 6 of the drawings, is actuated by a pivotal lever 206 which is also received on the shaft 250. The link latch lever 206 is actuatable by such devices as a hydraulic cylinder or an air diaphragm or other such arrangement, as is typically represented by the hydraulic cylinder 626 in FIG. 6 of the drawings. The advantages of such actuation will be described subsequently herein.

Additional portions of the towplate apparatus viewable in FIGS. 2 and 3 includes the sides 205 and 207 of the link 204, and the end bells 214 and 215 for the drogue parachute tension member mandrel 216. The combination of the end bells 214, 215 and the mandrel 216 form an electively segregatable expendable portion 217 or jettison portion of the link 204. The jettison portion 217 is received in notch or offset areas 312 and 322 of the link 204 as shown in FIG. 3.

Figure 5:
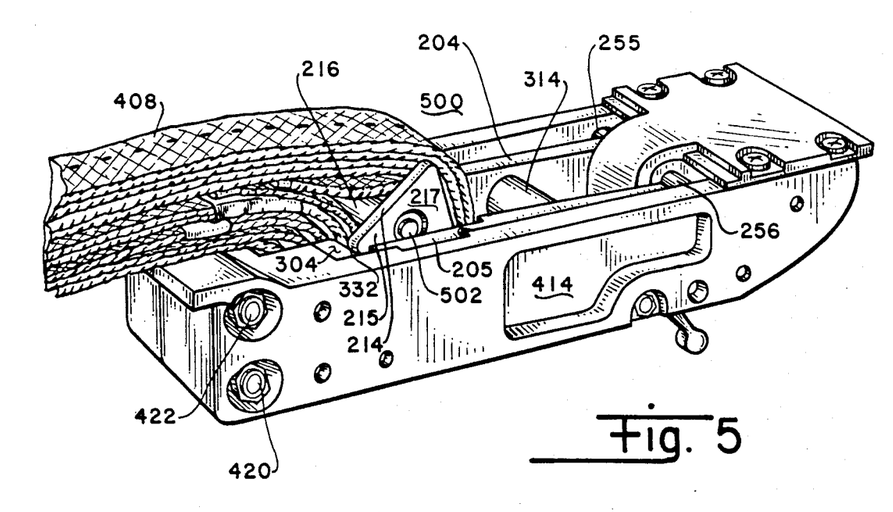
FIG. 5 is a topside perspective view of a tow/release mechanism showing operation during a drogue parachute jettisoning event.

As is best illustrated in FIG. 5 of the drawings, during a cargo delivery abort or jettison operation, the jettison portion 217 is allowed to escape from the remaining portion of the link 204 in order that the drogue parachute be released from the cargo carrying aircraft (and expended—along with the jettison portion 217) without completing the planned cargo extraction operation. Release of the jettison portion 217 from the link 204 is accomplished by a second lever shown at 208 in FIGS. 2 and 3. The lever 208 is mounted on the bracket 228 and pivots on the pin 230 to furnish axial motion to a jettison plunger 302. The bracket 228 is attached to the side frame member 238 by way of bolts 232 which may pass immediately through the bracket 228 into the side frame member 238 or pass through some intermediary member as is suggested by the space shown between the bracket 228 and the side frame member 238 in FIGS. 2 and 3.

Figure 3A:
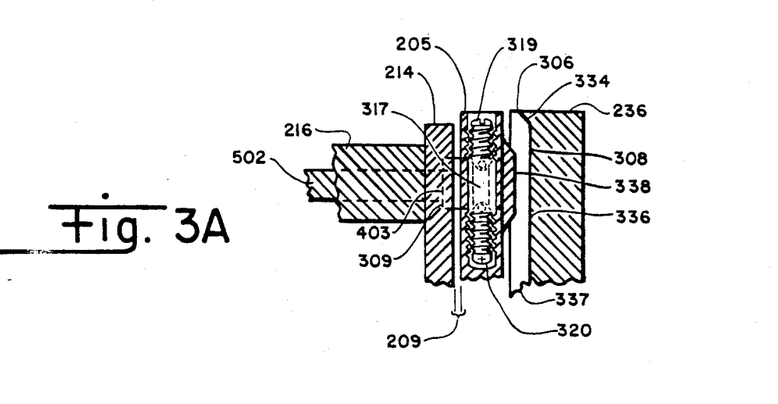

Escape of the jettison portion 217 from the link 204 as shown in FIG. 5 of the drawings is accomplished by way of the plunger 302 moving a jettison portion escape pin 502, shown in FIGS. 3A and 5, from a position of shear loading in the link 204 to a position of clearance with the sides 205 and 207 of the link 204. Axial movement of three members is involved in a jettison operation and in achieving this change of pin position from one of shear loading to one of link side clearance; these three members are the plunger 302, the jettison escape pin 502, and the enlarged pin 309 shown in the cutaway view 3A of the FIG. 3 drawings. Axial motion of these three members and the achieving of jettison portion escape is also shown in FIG. 1A of the above-incorporated by reference U.S. Pat. No. 3,865,333 of Fielding et al and in FIG. 7 of the above-incorporated by reference U.S. Pat. No. 4,398,686 of Leger et al, the enlarged pin 309 herein corresponds to the release pin 36 in the Leger FIG. 7 drawing.

Figure 2A:
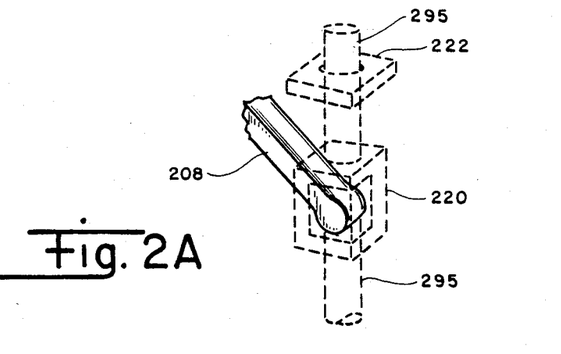

The lever 208 which imparts axial movement to the plunger 302 in FIG. 3 is also actuated by a pressurized fluid operated device such as an air diaphragm or hydraulic cylinder 292 which can generally be of the type shown at 626 in FIG. 6; the lever 208 may be connected to the hydraulic cylinder 292 by way of a pin and the hole 234 in the lever extremity or alternately and preferably, by way of a plug in socket arrangement located at the end of the plunger 205 of the hydraulic cylinder 292 in lieu of the clevis 293. The jettison lever 208 is shown received in a socket 220 in FIG. 2A of the drawings. A support member 222 for the distant end of the hydraulic cylinder plunger 295 is also shown in FIG. 2A. By way of the plug in socket arrangement 220 and a similar plug-in ball and socket arrangement for the hydraulic cylinder 626 shown at 631 in FIG. 6, the cradle receptacle 342 can be removed from its mounting cavity (622 in FIG. 6) for repair or replacement without disturbance of hydraulic components. The piston 292 is shown disconnected from the lever 208 in order to improve legibility of the FIG. 2 drawing. The piston 292 includes a clevis-like arrangement 293 in the piston connection rod for pin connection to the lever 208 using the hole 234.

The relationship between the side frame member 236, the link side 205, the mandrel end bell 214, the mandrel 216, the enlarged pin 309 and the jettison escape pin 502 is shown in somewhat magnified and exaggerated proportions in FIG. 3A of the drawings. This view represents a cut taken along the line 340 in FIG. 3 and shows the relationship between these elements when the jettison portion 217 is to be retained in the link 204, that is, when a cargo extraction sequence is desired. For retention of the jettison portion 217 in the link 204, the enlarged pin 309 provides coupling, at one end of the jettison portion 217, between the mandrel end bell 214 and the link side 205. Coupling by the pin 309 therefore spans the space 209 in FIG. 3A.

In order to allow escape of the jettison portion 217 the plunger 302 in FIG. 3 moves the jettison portion escape pin 502 in FIG. 3A to the right until the escape pin end portion 403 is located in the space 209. This same axial movement of the pin 502 also moves the beveled head 338 of the enlarged pin 309 into the head clearance cavity 337 located within the side frame member 236. This axial movement of the pin 502 also moves the left-hand end of this pin, that is, the interface of the pin 502 with the plunger 302, into a space similar to the space 209 at the left-hand end of the jettison portion 217. Retention of the jettison portion 217 in an integral relationship with the link 204 therefore occurs when the pin 502 is in its left-most axial position while escape of the jettison portion 217 occurs when the pin 502 is moved to its right-most position.

Retention of the pin 502 in its left-most position whenever the link 204 is released from capture in the cavity 344 is therefore important to functioning of the link 204. To assure this the pin 309 is retained within the link side 205 by two ball plunger assemblies 319 and 320 which are threaded and retained within the link side 205. The ball plungers 319 and 320 are threaded into 205 so that the balls of each snugly engage an annular groove 317 of enlarged pin 309. The spring force of each ball plunger assembly 319 and 320 against the sides of the annular groove 317 of pin 309 retain the pins 502 and 309 within the link 204 during ground handling and help retain the pins 502 and 309 during tow and release of link 204.

A beveled surface 334 is incorporated in the inward facing side of the side frame member 236; the edge of this beveled surface 334 fnd the outermost wall of the cavity 337 are shown as 306 and 308 respectively in FIG. 3A. The beveled surface 334 and cavity 337 allow movement of the enlarged pin 309 to the right in FIG. 3A during right hand directed releasing movement of the escape pin 502. The cavity 337 allows sufficient movement of pins 309 and 502 to allow separation of link portion 217 from link 204 while also proventing pin 309 from separating from link side 205. The beveled surface 334 of cavity 337 and beveled head 338 at the end of pin 309 also allow manual removal of link 204. During a link release event, the beveled surface 334 is arranged to engage the beveled edges of the enlarged head 338 of the pin 309 to press the pin 309 back into link side 205 to the ball detents engagement position with the groove 317 thereby preventing loss of pin 309 during removal of link 204. The bevels 338 and 334 prevent the pin 309 which is extending into cavity 337 from trapping the link 204 within the cavity 344 during a cargo extraction sequence. After jettison of the link jettison portion 217, removal of link 204 from the cradle receptacle 342 is necessary in order to re-arm the tow/release mechanism for another aerial delivery or for insertion of a coverplate 700 shown in FIG. 7.

It should be additionally realized that movement of the plunger 302 to place the pins 502 and 309 in the right-most or escape position for the jettison portion 217 is also achieved in the presence of loading from the drogue parachute 116 and is therefore desirably accomplished with the aid of the large force which can be generated by a hydraulic piston or similar device as is shown at 292 in FIG. 2. As is also described below in connection with FIG. 8, the relative dimensions used with the present invention apparatus intentionally increase the amount of shear loading applied to the jettison portion 217 and the pins 502 and 309 over the amount used in prior tow/release mechanisms in order to achieve reliable link operation. Such increases are negligible when compared to the increased shear loads caused by larger towed drogue parachute forces, forces of 12,000 pounds to 70,000 pounds, and forces for which the larger hydraulic generated forces are supplied for moving the plunger 302 and the latch 310.

The tongue plate member 258 in FIGS. 2 and 3 of the drawings provides covering for portions of the cavity 344 not involved in link escape movement. The tongue plate member 258 also includes a tongue portion 316 extending into the cavity 344 for guiding the cargo tension member bundle 404—the tension member 122 in FIG. 1, out of the cavity 344 during a link escape. It should be realized that the tongue portion 316 is not required to have extreme rigidity or structural strength, since the tension member bundle 404 is not under load stress while the link 204 is either captured or escaping from the cavity 344. The tongue portion 316 therefore serves principally to assure that the tension member bundle 404 remains clear of the movable link latch member 210.

The FIGS. 2 and 3 tow/release mechanism in one of its major uses is intended for mounting in a floor well located in the rearward portion of a cargo-carrying aircraft. This floor well may, for example, be located on a movable ramp portion of the aircraft. As indicated by the arrows 202 in FIG. 2 and 346 in FIG. 3, the drogue parachute tension member receiving end of the tow/release mechanism is intended for orientation toward the rear of the aircraft—so that the force expected from the drogue parachute tension members is received into the bosses 277 and 278 for transmission to the aircraft frame. Transmission of drogue parachute forces to the aircraft frame is intended to occur by way of the large abutment area surface 328 provided at the rearward facing end of the tow/release mechanism. Use of large surface area abutment surfaces or compression loading as a means of transferring tow/release mechanism forces to the aircraft frame contrasts with the practice described in the above-referenced patents wherein shear loading of large bolts was contemplated for force transfer to the aircraft frame.

The use of large abutment area compressive loading as a tow/release mechanism force transfer medium allows increased rigidity in the tow/release mechanism, since for example weakening of the side frame members 236 and 238 by including large bolt holes or other shear member attachment arrangements is not required. In the FIGS. 2 and 3 illustrated mechanism, the eight holes at 268 and 269 which can be sized for one-quarter inch and five-sixteenths inch diameter bolts, respectively, provide adequate retention of the tow/release mechanism in the aircraft—in view of the principal force transfer involving the abutment area surface compression transfer of force. The relatively small bolt head recess areas shown at 310 in FIGS. 2 and 3 also provide minimal weakening of the side frame members 236 and 238.

Figure 4:
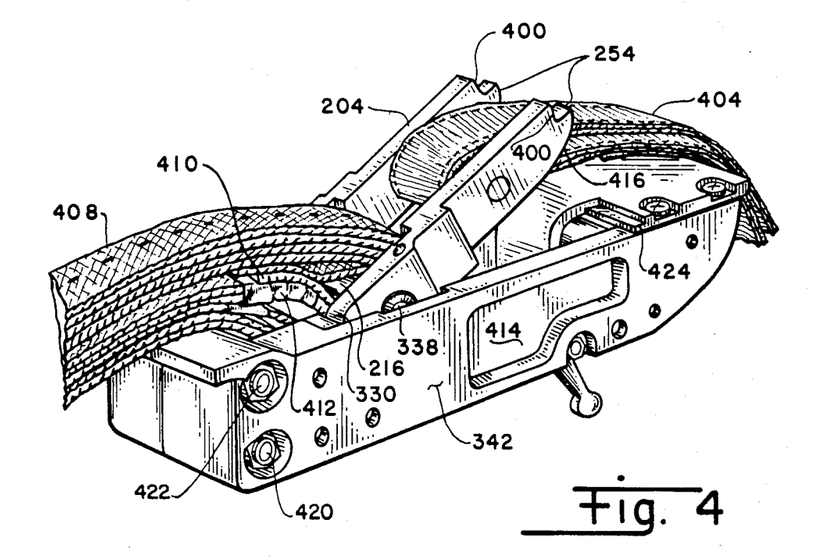
FIG. 4 is a topside perspective view of a tow/release mechanism showing portions of the flexible tension member strap bundle joined by a released and partially removed connecting link.

The incorporation of relatively large cross-sectional areas in the rearward portion of the side frame members 236 and 238 is visible in FIG. 2 of the drawings, the need for this large cross-sectional area and increased mass exists, of course, primarily in these rear portions of the FIGS. 2 and 3 apparatus, since only these portions carry the drogue parachute tension member loading. Relief area recess wells indicated at 242, 288, and 414 in FIGS. 2, and 4 provide desirable lightening of the tow/release mechanism in regions of low stress. The leg portions 280 of the bosses 277 and 278 are made integral with the side frame members 236 and 238 and provide load conduction paths from the bosses 277, and 278 toward the abutment surface 328 and also provide space for the mounting holes 269 and the recesses 310.

As indicated by the lead lines 284 and the dimension lines 285, 286 and 287 in FIG. 2, the overall length of the FIGS. 2 and 3 tow/release mechanism is contemplated to be in the range of 14 inches, the width to be in the range of 4½ inches and the depth in the range of 3 inches. The material used in the side frame members 236 and 238 can be 13–8 PH steel, or an equivalent material, which is available from numerous commercial sources. The link 204 including the jettison portion 217 may also be fabricated from 13–8 PH steel or equivalent materials. All of the other principal structural elements shown in FIGS. 2 and 3 can also be fabricated from this material, except for the steel pins 302, 309 and 502 which are preferably fabricated from American Iron and Steel Institute martensitic stainless steel or an equivalent material; such materials are also available from numerous commercial sources.

Additional aspects of the tow/release or towplate structure are shown in FIGS. 4 and 5 of the drawings. Many details shown in FIGS. 4 and 5 have been described above in connection with elements first introduced in FIGS. 2 and 3. The arrangement of the tension member bundle 408 around the mandrel 216 is shown, for example, in some detail in FIG. 4; this arrangement includes a short protective member 410 which can be made of cotton webbing and serves to protect the load carrying nylon webbing in the bundle 408 from abrasion or compression damage in mating with the mandrel 216. The tension member arrangement also includes a sewn-together end termination 412 of several individual tension members in the bundle 408. The cargo attached tension member bundle 404 is shown in abbreviated fashion in FIG. 4 and normally would include additional load carrying straps—up to the size of the drogue bundle 408. The cargo bundle 404 may in some instances be smaller than the drogue bundle 408, since its principal function is to pull the FIG. 1 extraction parachute 120 from the aircraft and the large load from dragging the drogue parachute in the aircraft slipstream is thereby not presented to the bundle 404.

Positioning of the link member 204 during one portion of its release or escape from captivity within the cradle receptacle 342 is clearly shown in FIG. 4. The shape of the link nose 254, the notch 400 and the link curvature portion 416 are also shown in FIG. 4. FIG. 4 also further shows the manner in which the concave surface 330 of the link heel pivots around the convex surface of the boss 278 during a link escape escape. FIG. 4 also shows the fully seated position of the beveled head 338 of the enlarged pin 309 during a link escape event.

Considering now FIG. 5 of the drawings, during a drogue parachute jettisoning operation, the concave surface 332 of the end bell 214 pivots or slides on the convex surface 304 of the boss 278 as shown in the left portion of FIG. 5 and in the same manner as was illustrated for the concave surface 330 of the link 204 in FIG. 4. Initiation of a drogue parachute jettisoning operation is, as indicated above, commenced by moving the pin 502 axially into the FIG. 3A illustrated position of clearance (at space 209) between the end bell 214 and the link side 205.

Considering again the views in FIGS. 3 and 5 of the drawings, it is preferable that the concave surface 332 of the end bell 214 rest on the concex surface 304 of the boss 278 even while the jettisoning portion 217 is held captive within the link 204; such an arrangement assures that only small upward components of the drogue parachute tensile member forces is applied to the pins 502 and the larger directed component of this force be transferred directly from the end bell surface 332 to the boss surface 304. If the end bell surface 332 and the boss surface 304 did not meet in this manner, all of the drogue parachute force would be received as shear load by the pins 502 and 309. As described in connection with FIG. 8, the additional friction resulting from this sliding relationship between surfaces 332 and 304 can be accommodated in the present arrangement by the additional upward component of drogue tension member force employed in the present invention. The large upward component of drogue tension member force is in turn enabled by the large force available from the jettisoning hydraulic piston 292 in comparison with previous tow/release mechanism arrangements.

FIG. 6 in the drawings shows a partially cut-away view of the FIGS. 2 and 3 tow/release mechanism as the mechanism would appear when installed in the floor of an aircraft or other vehicle. The FIG. 6 view includes two positions 600 and 602 of the link 204 showing the link in captured and released, partly escaped positions. In FIG. 6 the aircraft floor is indicated at 620 and the cavity for mounting the tow/release mechanism is identified as 622. The abutment of the towplate large area surface 328 with a mating cavity surface 636 in the aircraft is shown at the right-hand extremity of FIG. 6. The surfaces 328 and 636 are of course desirably located in intimate contact but are shown slightly separated in FIG. 6 for drawing clarity. The mating of the surfaces 328 and 636 is identified as interface 624 subsequently herein. The large drogue parachute tension member forces received on the mandrel 216 are transferred across the frictional surfaces 331 and 305 to the heel portion of the side frame member 238 and thence across the interface 624 to the aircraft frame.

FIG. 6 also shows with increased clarity the relationship of the latch ear 255 and the link notch 400 during captive retainment of the link 204 in the cradle receptacle formed by the side frame members 236 and 238. As can also be appreciated in FIG. 6, the torsion spring 252 is coiled around the shaft 250 and engaged at the ends thereof with the latch body portion and the bolt 244. Pivoting of the link latch actuation lever 206 around the shaft 205 can also be appreciated in the FIG. 6 view.

At 618 in FIG. 6, the action of an upper extremity of the link latch actuation lever 206 on the pivotally mounted latch member 210 can be viewed. To understand the cooperation between the elements 206 and 210 at 618, consider that during insertion of the link 204 into the cavity 344 of the tow/release mechanism, the latch ear 255 is rotated to the left and downward about the shaft 250 by the curving surface 418 of the link 204. Such rotation, of course, is opposed by the torque from the spring 252 which subsequently causes the ear 255 to return to the position illustrated at 604 once the link 204 is seated within the cavity 344. The extremity reached by the ear 255 during link insertion is shown at 606 in FIG. 6. During rotation of the latch member 210 between the positions 604 and 606 the link latch actuation lever 206 can remain motionless and movement of the stem 628 in the hydraulic cylinder 626 is not required—by way of increasing the gap 618 wherein the actuation lever 206 acts on the latch member 210. This lost motion or free wheeling relationship between the latch member 210 and the lever 206 permits insertion of the link 204 without displacing hydraulic fluid and without the attendant need for venting and air entry into the hydraulic cylinder 626.

The residual or quiescent position of the lever 206 is indicated at 612 in FIG. 6, and the extended or link release position of this lever is shown at 614. The extended position 614 allowing escape of the link 204 under the urging of force from the drogue parachute tension members received on the mandrel 216. The stem 628 of the hydraulic piston 626 of course provides force for moving the lever 206 between the positions 612 and 614 to accomplish link release. A rounded end of the lever 206 is received in a socket portion of the stem 628 as is generally indicated at 631.

A property of the hydraulic cylinder or air diaphragm device or other similar apparatus employed at 626 in the FIG. 6 mechanism should be considered in arranging the relationship of the device 626 to the lever 206. This property concerns the effect of lost hydraulic pressure or air pressure on the maintained position of the lever 206. It is desirable of course for the lever 206 to remain in the position 612 even though hydraulic system pressure is removed—so that re-latching of the link is not necessary following shut-down of the aircraft.

Maintaining of the position 612 without hydraulic pressure can be achieved either by the use of a bias spring in connection with the hydraulic cylinder 626 or by careful attention to a combination of cylinder venting paths and small area piston side vs. large area piston side connection of the cylinder to the lever 206. The FIG. 6 illustrated arrangement presumes the presence of a bias spring within the cylinder 626 since porting of the larger area left-hand side of the cylinder piston and the smaller area right-hand side of the cylinder's piston to equal pressures would tend to undesirably move the lever 206 into the position 614 in the absence of spring bias. Air diaphragm and hydraulic piston devices incorporating bias spring arrangements are available commercially.

The function of the bracket 264 shown without description in FIG. 2 is apparent from the FIG. 6 drawing. The hole 266 in the bracket 264 receives a magnetic proximity sensing device 608 that is connected to external electronic circuitry by way of a pair of leads 630. The bracket 264 is attached to the side frame member 238 with flush rivets 270. The proximity sensing device 608 can be fabricated from a ferrous magnetically conductive core member surrounded by electrical windings as is known in the magnetic art. The purpose of the proximity sensing device 608 in FIG. 6 is to identify the "armed" position of the target indicator element 212 shown in FIGS. 2 and 6 of the drawings.

As shown in the FIG. 6 view, the target indicator 212 is pivotally mounted at the center axis of the latch member ear 255 and is preferably urged in a counterclockwise position by a torsional spring which is not shown in the drawings. As illustrated at 616 in FIG. 6, the target indicator element 212 is arranged to rest on the nose portion 254 of the link 204 when the link is held captive against the boss 277 in the cavity 344. Torsional spring action on the target indicator tends to rotate the target indicator 212 into a position parallel with the latch element 210 in the absence of a captured link 204 in the FIG. 6 apparatus. The magnetic proximity sensing device 608 is therefore capable of sensing the fully latched or "armed" position of the link 204 in the cavity 344 through electronic circuitry connected to the leads 630. The electronic circuitry can indicate this "armed" condition remotely to panels used by the aircraft loadmaster or pilot, or both.

It should be noted that even a minor displacement of the ear 255 from the position 604 as might be caused, for example, by the presence of dirt or foreign material in the notch 400 or between the concave surface 331 and the boss 277 would cause a significant change in the length of the air gap 610 between the target indicator 212 and the proximity sensing device 608—in other words the target indicator mounting and operating arrangement provide a highly sensitive indication of link positioning. The air gap 610 is normally adjusted using the nuts 632 and 634 to about 0.090 inch with a link 204 latched in the cavity 344. Previous tow/release mechanisms commonly employed a snap action electrical switch for sensing the safe or armed condition of the mechanism; such switches have been found to be failure-prone in both the "armed" and "non-armed" indication positions. Mounting of the target indicator 212 on the extremity of the latch 210 together with close manufacturing control of the curvature 416 and the link nose shape contribute to the highly sensitive arrangement of the target indicator element—sensitivity to a partially latched link condition or to other abnormal conditions, such as incorrect positioning of the lever 206, or the latch 210, or as indicated above, the presence of foreign material in the link holding surfaces.

Figure 7:
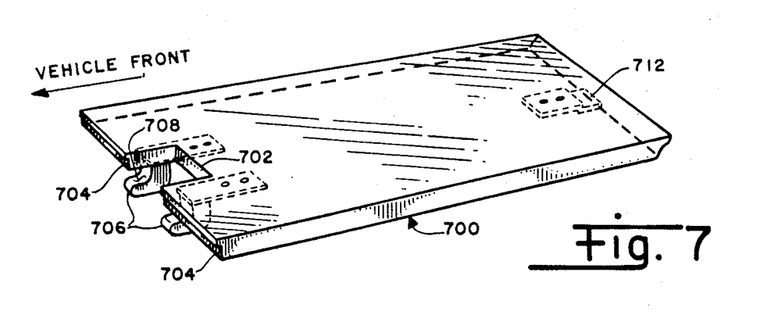
FIG. 7 shows a cover plate member usable with the FIGS. 1-6 towplate.

FIG. 7 of the drawings shows a coverplate member 700 for use when a towplate containing aircraft is to be used for other than parachute extracted cargo missions. The coverplate 700 includes a pair of hook members 706 having a notch surface 708 shaped to resemble the notch 400 in the link 204 and having a hook frontal surface portion 710 shaped to resemble the link nose portion 254. It is intended therefore that the coverplate 700 be fully compatible with the link 204 and be receivable in direct substitution for the link 204 in and over the cavity 344. The similarity between the hook members 706 and the nose portion of the link 204 also enables the activation of the target indicator element 212 by the hook members 706. The forward facing edge of the coverplate 700 includes a rectangular notch 704 which mates with the similarly shaped notch 424 in FIG. 4. The coverplate cutaway portion 702 of course, receives the tongue member 316 when the coverplate is located in position over the tow/release mechanism. The coverplate 700 is arranged to rest on the heel surface 638 at the rearward end of the FIG. 6 tow/release mechanism while in position covering the mechanism. The thickness of the coverplate 700 is preferably arranged to provide a flush covering of the tow/release mechanism and a smooth extension of the floor portions 620 on either side of the cavity 622 in FIG. 6. A spring tongue member 712 is located at the rearward facing end of the coverplate 700; this spring tongue engages the slot 290 shown in FIG. 2 to hold the cover plate in contact with the surface 638 when installed.

Figure 8:
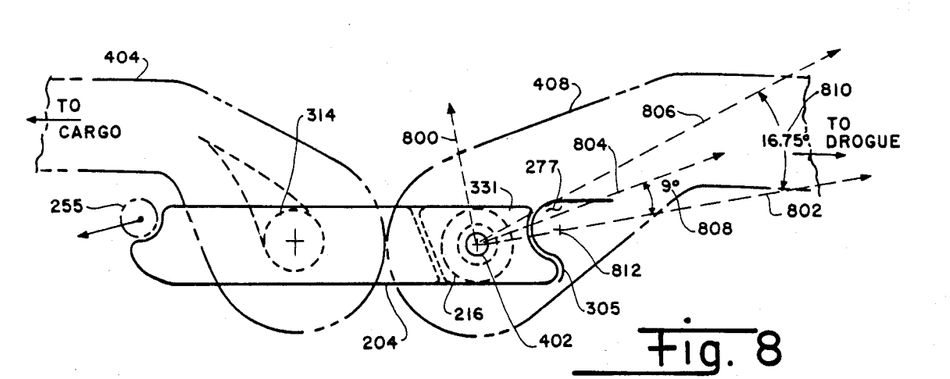
FIG. 8 shows a connecting link member usable in the FIGS. 1-6 apparatus along with certain force relationships pertinent to link operation.

Some of the forces significant to operation of the tow/release mechanism of the present invention are indicated in FIG. 8 in the drawings. In order that the link 204 in FIG. 8 be capable of moving in a clockwise direction about the pivot point 812, once release of the link nose by the latch ear 255 has occurred, some upward force or clockwise torque about the pivot point 812 is necessary. Such clockwise torque can, of course, be provided by disposing the drogue parachute tension member bundle 408 along some axis elevated above the axis 802 connecting the center of the mandrel 216 with the pivot point 812. In prior tow/release mechanisms it has been common to dispose the tension member bundle 408 along an axis substantially as shown at 804 in FIG. 8—at an angle 808 of about 9 degrees, in order to provide a limited clockwise torque about the point 812. This rather small angle limits the force applied to the ear 255 and to the low friction ball or roller bearing heretofore employed on the ear 255 in order to not overload the ear bearing and enable manual movement of the latch 210 and the ear 255 under the modest load conditions of the previously used moderately sized drogue parachute. In short, selection of the angle 808 heretofore has involved a compromise between achieving desirably large forces to assure clockwise rotation of the link 204 and limiting these forces to magnitudes that can be controlled with a manually actuated latch ear 255. In the present invention, the greatly increased drogue parachute size and the developed drogue parachute force requires the use of greater compressed air or hydraulically provided forces for moving the latch ear member 255. Use of compressed air or hydraulics allows improvement in release forces applied to the latch ear member 255 and use of increased angles 808. Angles of 16.75 degrees as indicated at 810 are preferred in the present invention. It is also significant that the present invention improvements have eliminated the need for a low friction ball or roller bearing on the latch ears 255 and 256. This improvement contributes to a reduced cost for the tow/release mechanism and also allows increased reliability in the operation of the link 204 by both eliminating failure prone components and by providing greater clockwise torque about the pivot point 812. This increased torque, for example, substantially eliminates the possibility of binding between the beveled head 338 and the surface 334 in FIG. 3A.

Another improvement afforded by the present invention can also be appreciated from the FIG. 8 view of the apparatus. In previous towplate arrangements, it has been common practice to employ a ball or roller bearing in lieu of the boss 277, that is, a low friction bearing cetered on the pivot point 812 has been used in order that the clockwise torque component available with the small 9 degreee angle at 808 be assured of rotating the link 204 when desired. Such arrangements have usually involved a cantilever supported bearing, that is, a bearing mounted on a bolt received in a hole centered on the axis 812. Both the cantilever bearing suspension and the presence of this bearing per se have been points of frequent problem with prior tow/release mechanisms (such problems as bolt bending, bolt receiving structure failure and bearing lubrication and dirt effects have occurred). Moreover, for accommodating the drogue parachute loads contemplated in the present invention apparatus loads of 70,000 lbs., it is calculated that a bearing for use in lieu of the boss 277 would be some four inches in diameter—and would have so little circumferential curvature as to be incapable of capturing the heel end or rearward end of the link 204. A cantilever support arrangement for such a bearing, in view of the contemplated drogue parachute loads, would also require such massive side frame construction as to undesirably increase the overall size and weight of the tow/release mechanism.

Use of the structurally desirable but high friction surfaces 305-331 and 330-304 in FIGS. 3, 6 and 8 is therefore a desirable arrangement for a tow/release mechanism, but is achievable with the presently contemplated load forces only with the introduction of improvements such as described herein—improvements which allow improvement over manual and solenoid derived operating forces. Since aircraft hydraulic systems commonly operate in the pressure range of 3000 psi, relatively small hydraulic cylinders in the 292 and 626 positions of the apparatus can provide desirably large operating forces. Such devices can provide forces in the range of 6000 lbs. for urging axial movement of the pins 502 and 309 in FIG. 3A—including the mechanical advantage achieved with the lever 208. Forces of this magnitude are especially desirable after the tow/release mechanism has been in use for some period of time and the effects of dirt, corrosion, ice, and other real-life phenomena have increased operating force requirements over the values expected at the time of manufacture.

Figure 9:
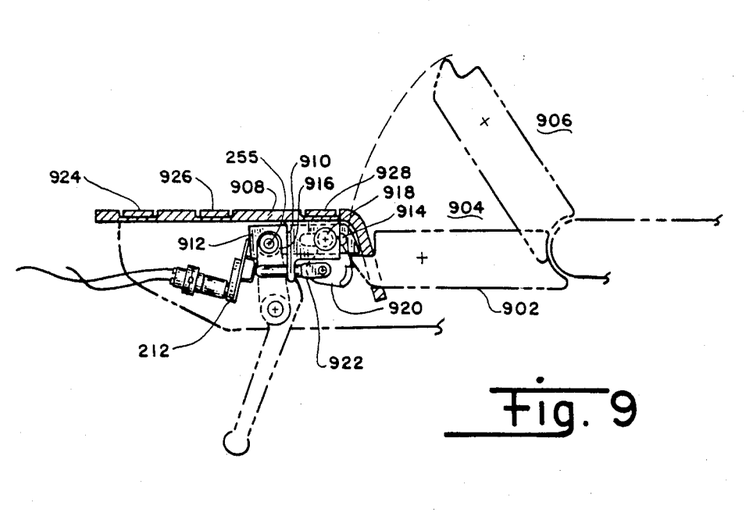
FIG. 9 shows an adapter arrangement enabling use of the FIGS. 1-6 apparatus with small connecting links.

The present invention tow/release mechanism can also accommodate existing equipment small size versions of the link 204 as is shown by the link 902 in FIG. 9. The small size link 902 might comprise, for example, a portion of a drogue parachute apparatus capable of exerting loads in the range of 7000 lbs. on parachute tension members. The small sized link 902 is shown in captured and released positions 904 and 906 in FIG. 9 in the same manner as was illustrated for the large link 204 in FIGS. 4 and 6 of the drawings. Use of the small size existing equipment link 902 with the present invention apparatus can be achieved through the use of an adapter mechanism as shown in FIG. 9. This adapter mechanism principally includes a modified version of the tongue plate member 258 shown at 908, a latch extension member 912, and a pivotal extension linkage for operating the target indicator 212. This pivotal linkage includes the bell crank member 920 and the extension arm 922. Both the latch extension member 912 and the bell crank member 920 can be conveniently mounted on a projection from the modified tongue plate member as shown at 910 in FIG. 9.

A machine screw or like device at 918 can be used to hold the latch extension 912 captive by way of a slot 914 in the latch extension. The bell crank 920 may also be mounted on the machine screw 918 and the latch extension 912 can be coupled to the latch ear 255 by way of a notch or mating cut 916 in the latch extension member—with the notch or cut being received over the ear 255. The modified tongue plate member 908 in FIG. 9 can be attached to the side frame members 236 and 238 in lieu of the tongue plate member 258 with machine screws at 924 and 926, such screws correspond to the screws 260 in FIG. 2, and also with additional machine screws located in the position 928 and received in the tapped holes 272 and 273 shown without description in FIGS. 2 and 3. A pair of latch extension members 912, one for each nose portion of the link 902, is of course, intended in the FIG. 9 apparatus. A single bell crank and extension arm 920 and 922 can be used in this arrangement or preferably, duplicate bell crank and extension members are used for the link nose portion located directly behind the element shown in FIG. 9.

Figure 10:
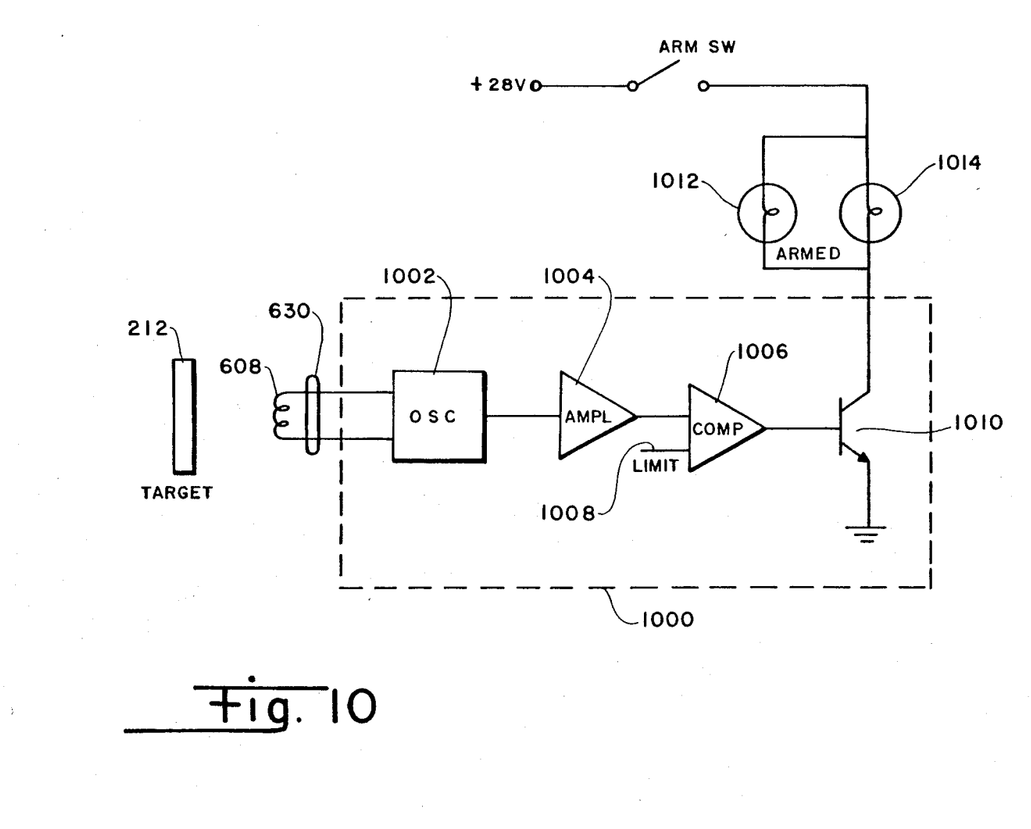
FIG. 10 shows electrical circuitry usable for detecting the armed or safely-latched condition of the FIGS. 1-6 towplate.

FIG. 10 in the drawings shows a block diagram of an electrical circuit 1000 that is capable of processing the low level analog signal received from the magnetic proximity sensing device 608 in FIG. 6 by way of the leads 630. The FIG. 10 circuit is capable of generating from this analog magnetic signal a binary data signal indicating the "armed" condition in a tow/release mechanism to a loadmaster and the aircraft pilot. The FIG. 10 circuit includes a source of alternating current energy, the oscillator 1002, for supplying an undulating magnetic flux in the sensor 608. The quantity of this flux is responsive to proximity of the tow/release mechanism target indicator 212, to the sensing device 608. The FIG. 10 circuit also includes a low level amplifier 1004 for increasing the magnitude of the AC signal received from the magnetic proximity sensing device 608, a threshold or comparison decision circuit 1006 for comparing the received signal with a predetermined amplitude limit value 1008 and binary circuitry the transistor 1010 for driving "armed" indicator lamps 1012 and 1014 located at the loadmaster station and in the aircraft cockpit.

It should also be recognized that different names have been applied to the same or related concepts in this document, the names towplate and tow/release mechanism, the terms escape and release, the terms link and connecting link and the terms cradle and cavity are examples of such usage. Such usages are intended to be broadening rather than limiting with respect to the invention and the concepts thus described are believed within the comprehension of persons skilled in the art.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Towplate apparatus for controlling the removal of carried cargo from a moving aircraft by an extraction parachute comprising:
   a cargo carrying aircraft;
   a drogue parachute disposable trailing said aircraft in flight;
   a rigid link member capable of splicing flexible tension members received from said drogue parachute to a flexible tension member connecting with said carried cargo, and said extraction parachute;
   a cradle receptacle mounted adjacent a rearward opening of said aircraft and capable of releasably receiving and capturing said rigid link member and of pulling said drogue parachute via one of said tension members during flight of said aircraft, said cradle receptacle including a link capturing latch member movably mounted therein;
   first pressurized fluid operated means connected with said cradle recaptacle latch member for moving said latch member to a link releasing position in the presence of latch friction induced by a large link loading from said drogue parachute;
   an electively segregatable link portion capturing said drogue parachute tension member in said link; and
   second pressurized fluid operated means engaging said link member during link reception in said cradle receptacle for electively segregating said link portions from the link body and jettisoning said drogue parachute and link segregatable portion from said aircraft also in the presence of large segregatable link portion friction and link load from said drogue parachute.

2. The apparatus of claim 1 wherein said first pressurized fluid operated means capable of moving said latch member to said link releasing position in the presence of link loads of seventy thousand pounds from said drogue parachute.

3. The apparatus of claim 1 wherein said link member includes a pair of endwise engageable predetermined length pin members received in axially alignable apertures of said link body and segregatable link portion and capable of retaining said segregatable link portion integral with said link body in a shear loaded first position thereof and of releasing said segregatable link portion from said link body in a clearance second axial position thereof and wherein said second hydraulic cylinder and piston means engages said pin members axially in said cradle receptacle for displacing said pin members from said shear loaded first to said clearance second axial positions for drogue parachute jettisoning and wherein said cradle receptacle includes ramp means, engageable by one of said link pin members during a latch member initiated release of said link wherein said link is to remain integral, for urging said pin members securely into said shear loaded axial position thereof.

4. The apparatus of claim 1 wherein connection of said first hydraulic cylinder and piston means with said cradle receptacle includes lost motion linkage means for communicating link releasing latch movement from a hydraulic piston in said first pressurized fluid operated means to said link capturing latch member without corresponding communication of latch member movement and hydraulic fluid and air displacement during reception and capture of said link member within said cradle receptacle.

5. The apparatus of claim 1 wherein said link member includes a pair of concave socket portions of predetermined radius adjacent one end thereof;

said cradle receptacle includes a cavity containing a pair of convex male portions of substantially said predetermined radius integral with side end adjacent portions of said receptacle and receivable in said link socket portion;

whereby said link member is retainable captive in said cradle receptacle cavity between said latch member and said convex curved portions.

6. The apparatus of claim 5 wherein said cradle receptacle further includes latch member spring bias means urging said latch member into a capturing position engaging said link member and urging said captured link member against both said convex curved receptacle portion and a third point within said cradle receptacle.

7. The apparatus of claim 6 wherein said latch member is pivotally mounted within said cradle receptacle cavity and wherein said spring bias means includes a torsion spring member concentric with said latch member pivotal mounting.

8. The apparatus of claim 5 wherein said concave socket portion and convex male portions comprise sliding frictional surfaces integral respectively with said link and cradle receptacle members;

whereby structural integrity and rigidity are maximum in said link and cradle receptacle notwithstanding substantial movement friction between said elements during link release.

9. The apparatus of claim 8 wherein said latch member includes integral sliding friction ear portions capture engageable with said link member;

whereby maximum latch structural integrity and rigidity are achieved with a resultant increase of latch movement force.

10. The apparatus of claim 1 wherein said link member includes a drogue device tension member receiving end and said cradle receptacle member includes an exterior face large area abutment surface located adjacent a receptacle end capable of receiving said drogue device tension member end of said link.

11. The apparatus of claim 10 wherein said cradle receptacle large area abutment surface is located in force transmitting adjacency to a mating large area abutment surface structural member in said aircraft;

whereby shear force loading of tensile members retaining said cradle receptacle within said aircraft is minimized and drogue parachute force is transmitted through a minimal extent of said cradle receptacle to said vehicle abutment surface.

12. The apparatus of claim 1 further including a movably mounted electromagnetic field operated indicator member locatable in a first indicator position in response to capture of said link member in said cavity by said latch member and in alternate indicator positions in response to incomplete latch member capture of said link member in said cavity.

13. The apparatus of claim 12 wherein said indicator member is pivotally disposed on a rotationally extreme portion of said latch member in said cradle receptacle.

14. The apparatus of claim 13 wherein said indicator member includes means engaging a portion of a link member received in said cradle receptacle cavity for locating said indicator in said first indicator position.

15. The apparatus of claim 12 wherein said indicator member is comprised of alternating magnetic flux responsive material and said apparatus further includes alternating current energy excited magnetic means for sensing the position of said indicator member.

16. The apparatus of claim 15 wherein said magnetic flux responsive material is a ferrous material and said alternating current excited means includes a magnetic solenoid member located adjacent said indicator first position.

17. The apparatus of claim 1 further including plug-in mechanical socket means located intermediate an output member of said pressurized fluid operated means and said cradle receptacle latch member for removably connecting said members;

whereby said cradle receptacle can be removed from said aircraft without removal and disconnection of said pressurized fluid operated means.

18. Apparatus for controlling drogue parachute extraction of cargo from a moving aircraft comprising:

a cargo carrying aircraft;

a drogue parachute disposable at the end of a drogue flexible tension member trailing said aircraft;

a rigid link member capable of splicing said drogue parachute flexible tension member and a flexible tension member received from said aircraft cargo into an integral tension member, said rigid link member including:

a link body portion, a segregatable link portion receiving said drogue flexible tension member and electively integratable with said link body portion to form said rigid link member, a pair of axially engageable predetermined length pin members received in axially alignable apertures of said link body portion and said segregatable link portion, and capable of retaining said segregatable link portion and said link body portion in integral relationship in a shear loaded axial position thereof, and of releasing said segregatable link portion from said link body in a clearance axial position thereof, and a concave socket pivot portion of predetermined concavity radius integral with said link body portion, and located at one rigid link end;

a cavity containing cradle receptacle member mounted adjacent a rearward opening of said aircraft, and capable of releasably receiving and capturing said link member and of thereafter connecting and pulling said drogue parachute tension member along with said aircraft, said cradle receptacle member including:

a link capturing latch member pivotally mounted therein and including sliding friction ear members engageable with an end portion of said link member opposite said concave socket pivot portion thereof, a torsion spring member located concentric the pivotal point of said latch member and biasing said latch member into a position of engagement with said link member, a convex protuberance portion of substantially said predetermined radius integral with said cradle receptacle member and pivotally receivable in said link body portion socket pivot portion, an exterior facing large area abutment surface located at said convex protuberance portion end of said cradle receptacle member for force transmitting mating with a structural member of said aircraft, ramp means axially engageable by one of said link member pin members during a link release initiated by movement of said latch member;

first pressurized fluid operated hydraulic means connected with said cradle receptacle latch member for moving said latch member to a link releasing position in the presence of latch friction and link load from said drogue parachute;

second pressurized fluid operated hydraulic means engaging said link member during link capture in said cradle receptacle for electively moving said axially engageable pin members into a link segregatable portion releasing clearance axial position thereof in the presence of link loading by said drogue parachute; and second parachute means connected with said cargo flexible tension member at a point intermediate said rigid link member and said cargo for extracting and lowering said cargo from said aircraft in response to link release and second parachute means parachute inflation triggering from said drogue parachute.

19. Towplate apparatus for controlling parachute extraction of carried cargo from a moving aircraft comprising:

a cargo carrying aircraft;

a parachute disposable trailing said aircraft;

a rigid link member capable of splicing flexible tension members received from said parachute and from said carried cargo into an integral tension member;

a cradle receptacle mounted adjacent a rearward opening of said aircraft and capable of releasably receiving and capturing said link member and of thereafter connecting and pulling said parachute tension member along with said aircraft, said cradle receptacle including a link capturing latch member movably mounted therein; and hydraulic piston and cylinder operated means connected with said cradle receptacle latch member for moving said latch member to a link releasing position in the presence of latch friction and link load from said drogue device; and receptacle adapter means receivable in said cradle receptacle for decreasing the size of a link receiving cavity therein, said receptacle adapter means including latch extension means connected with said movably mounted latch member for engaging and capturing a foreshortened link member within said receptacle cavity.

20. The apparatus of claim 19 further including a movably disposed indicator member locatable in a first indicator position in response to capture of said link member in said cavity and additionally including indicator extension means disposed on said receptacle adapter member for actuating said indicator member from said foreshortened link member.

* * * * *